(12) United States Patent
Vancompernolle et al.

(10) Patent No.: US 7,426,822 B2
(45) Date of Patent: Sep. 23, 2008

(54) METAL CORD

(75) Inventors: Stijn Vancompernolle, Ghent (BE); Bert Vanderbeken, Waregem (BE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 10/514,420

(22) PCT Filed: May 6, 2003

(86) PCT No.: PCT/EP03/50143

§ 371 (c)(1), (2), (4) Date: Nov. 15, 2004

(87) PCT Pub. No.: WO03/100164

PCT Pub. Date: Dec. 4, 2003

(65) Prior Publication Data

US 2005/0172605 A1    Aug. 11, 2005

Related U.S. Application Data

(60) Provisional application No. 60/382,369, filed on May 23, 2002.

(30) Foreign Application Priority Data

May 23, 2002   (EP) .................................. 02100554

(51) Int. Cl.
*D02G 3/02*    (2006.01)
(52) U.S. Cl. ......................................... 57/237
(58) Field of Classification Search ............... 57/202, 57/236, 237; 156/47, 158, 166
See application file for complete search history.

(56) References Cited

U.S. PATENT DOCUMENTS

| | | | | |
|---|---|---|---|---|
| 3,908,715 A * | 9/1975 | Spiessens | ................... | 140/111 |
| 4,709,542 A | 12/1987 | Krafft | | |
| 4,724,929 A * | 2/1988 | Coleman et al. | ............. | 187/411 |
| 5,099,902 A * | 3/1992 | Shurman | ................... | 152/540 |
| 5,337,548 A * | 8/1994 | Kelly | ............. | 57/23 |
| 5,784,874 A * | 7/1998 | Bruyneel et al. | ............. | 57/237 |
| 6,780,096 B1 * | 8/2004 | Brown et al. | ................. | 451/535 |
| 2005/0172605 A1 * | 8/2005 | Vancompernolle et al. | .... | 57/237 |

FOREIGN PATENT DOCUMENTS

DE         2 249 620 A       4/1974

* cited by examiner

*Primary Examiner*—Shaun R Hurley
(74) *Attorney, Agent, or Firm*—Foley & Lardner LLP

(57) ABSTRACT

A metal cord comprising at least two metal strands. At least one strand is welded, with the welded strand having an elongation at rupture of more than 30% of the elongation at rupture of an identical strand without a weld.

37 Claims, 4 Drawing Sheets

METAL CORD

The present invention relates to metal cords and more in particular to the improvement of the tensile strength of the metal cord at welds present over the length of the metal cord.

BACKGROUND OF THE INVENTION

At present, using welds to connect two ends of metal cords is avoided as much as possible. This is since metal cord welds create an inflexible zone in the metal cord, disturbing e.g. the bending of the metal cord. Further, the weld in the metal cord creates a weak zone as far as mechanical properties such as tensile strength are concerned. The force at rupture of a welding zone of a cord is usually less than 60% of the force at rupture of the metal cord without the welding zone.

Another important aspect is noticed when several metal cords are used e.g. to reinforce a timing belt or for use in elevator belts. When one metal cord breaks during load, this seems to create a "shock-effect" or "cascade effect", which usually causes break of all adjacent metal cords, or even the whole belt. The same applies when several windings of a metal cord are used to reinforce e.g. endless belts. This is another reason why no welds are allowed in these applications.

An other disadvantage of the inflexible zone of the weld, using metal cords in polymer or rubber matrices, is that at the welding zone, due to the inflexibility of the weld, the weld tends to migrate in the polymer or rubber in a transversal direction when the metal cord is bend. This may cause shearing of the matrix.

Avoiding the welds of cords is obtained by demanding predetermined lengths for the metal cords without welds to be supplied. This specified length causes a significant price increase of the metal cords. The metal cord manufacturer faces a waste increase, since insufficient lengths of metal cords or intermediate products cannot be sold or used.

SUMMARY OF THE INVENTION

The present invention provides a metal cord, which overcomes or reduces the problems of price increase and decrease of mechanical properties of the metal cord and possibly the object in which the cord is used.

According to the present invention, the metal cord comprises at least two strands. At least one of these strands comprises a weld, which welded strand having an elongation at rupture, which is at least 30%, but preferably larger 35% or even more than 40% of the elongation at rupture of the metal strand in which no weld is present.

Preferably, the welded strand has a force at rupture being more than 30%, but preferably larger 35% or even more than 40% of the force at rupture of the not-welded strand.

The weld at the metal strand preferably has a diameter, being less than 1.2 times the strand diameter or even more preferred, less than 1.1 times the strand diameter. The weld at the metal strand preferably has a diameter, being more than 0.8 times the strand diameter or even more preferred, more than 0.9 times the strand diameter. Most preferably, the weld diameter is essentially identical to the strand diameter itself.

A metal cord as subject of the invention has to comprise at least to strands, most preferably however, such metal cords comprises more than 2 strands, such as 3, 4, 5, 6, 7, 8, 9 or even more strands. All strands may be identical, or may be provided using different strand constructions, a different number of filaments or different filament diameters.

Preferably, for each radial cross-section of the metal cord, there is at least one, but more preferably more than one strand which is not welded in this cross-section.

Even more preferred, at each radial cross-section of the metal cord as subject of the invention, only one metal strand is welded. At the location in the metal cord, where this one metal strand is welded, the other strands of the metal cord are not interrupted and do not comprise a weld near the weld of the one metal strand being welded.

Preferably the other strands do not have a weld over a length of the metal cord (hereafter called "welded part") which comprises the weld of the one metal strand of the metal cord. This welded part has a welded part length L, being at least 2 times the lay length of the metal cord. Possibly the welded part length is 2.5 or 5 or even 10 times the lay length of the metal cord.

Such weld having a relatively high elasticity may be obtained by using carefully chosen settings during the welding and preparation steps.

A method to provide a weld, which has improved elasticity, may be obtained by:

Providing an essentially flat cross-section on both ends of the metal cord which are to be welded to each other;

At both ends of the metal strand, to be welded to each other, decreasing the lay length $L_s$ of the strand; $L_s$ may be decreased locally to less than 75% of the original lay length of the strand, or even less than 65% or less than 50% of the original lay length of the strand.

During welding, the welding parameters are to be set according to the strand properties; such welding parameters are welding time, welding current, welding pressure and the distance between the electrodes fixed on the metal strand; the two ends to be welded are clamped by two electrodes, at a predetermined distance of the end of the strand to be welded. This distance is preferably as small as possible, e.g. less than 2 mm, meanwhile leaving enough strand material to be welded. Both ends are pressed to each other with a preset pressure and during a preset time, a specific electrical current flows through the strand from one electrode to the other.

After welding, the annealing parameters are to be chosen according to the strand parameters. Such annealing is preferably done using electrical current. Two annealing electrodes are fixed to the strand each on an essentially identical preset distance of the weld, and during a preset time, a preset electrical current is to flow through the strand from the one annealing electrode to the other.

The so-called welded part length may comprise at least the length of both metal strand ends, which have a decreased lay length, obtained by the preparation steps. The weld is preferably located essentially in the middle of the welded part length. The welded part length of the metal cord is then at least equal to the length of the metal cord, which comprises both ends with decreased lay length.

The distance between the welding electrodes and the distance between the annealing electrodes is preferably smaller than the sum of the lengths with decreased lay length.

Such welds have the advantage that they further can be used in the process of cord construction operations, either double or single twisting operations.

A metal cord as subject of the invention may have any cord construction comprising at least two strands, each comprising at least two metal filaments. However, some constructions have a larger benefit of the invention.

Preferably, 'n×m-'constructions are used, e.g. 3×3, 7×3, 4×7, 7×4, 7×7 or 7×19. n is to be understood as the number of strands in the cord, each strand having m filaments. It is understood that each strand may comprise different filaments, which are of e.g. a different diameter, a different alloy or have a different coating.

Also '$m_1+(n \times m_2)$-' constructions may preferably be used. Around a core strand of $m_1$ filaments, n strands of $m_2$ filaments are provided. An example is a 3+5×7-cord, being a cord comprising a core stand of 3 filaments, around which 5 strands of 7 filaments each are provided. The filaments $m_1$ and $m_2$ may be of the same or a different diameter. As an example, a 19+8*7-cord may be provided. The cord has a optical cord diameter of 1.7 mm. Such metal cord is provided using a core strand, which comprises a core filament of diameter 0.19 mm, around which 18 filaments of diameter 0.16 mm is twisted in two layers. Around this core strand, 8 strands are twisted, each of these strands comprising a core filament of diameter 0.16 mm, around which 6 filaments of 0.15 mm are twisted. As an other example, a cord with cord construction (0.25+6*0.23)+6*(0.23+6*0.21) or (0.25+6*0.23)+6*(0.22+6*0.22) may be used. As a further example, a cord with construction (7*0.22)+6*(0.22+6*0.21) or (7*0.22)+6*(0.21+6*0.19) may be used. It is understood that each strand may comprise filaments, which are of e.g. a different diameter, a different alloy or have a different coating.

A metal cord as subject of the invention has an optical cord diameter preferably less than 14 mm, e.g. less than 12 mm or less than 9 mm or less than 7 mm, such as less than 5 mm, or less than 4 mm or even less than 2.5 mm, such as less than 2 mm or less than 1,7 mm. The optical cord diameter is the diameter of the smallest imaginary circle, which encompasses the radial cross-section of the cord.

The strands used to provide a metal cord as subject of the invention have an optical strand diameter preferably less than 5 mm, e.g. less than 4 mm or less than 2.5 mm or even less than 1.75 mm, such as less than 0.6 mm, The optical strand diameter is the diameter of the smallest imaginary circle, which encompasses the radial cross-section of the strand.

The diameters of the metal filaments is preferably less than 1.15 mm, e.g. less than 1.05 mm or less than 0.85 mm or even less than 0.7 mm, such as less than 0.5 mm, or less than 0.3 mm or even less than 0.25 mm, such as less than 0.21 mm. Usually however, the diameter of the metal filaments is not smaller than 0.04 mm.

Metal cord as subject of the invention, preferably are provided out of steel alloys, most preferably out of carbon steels, having more than 0.275% C or more than 0.4% C or even more than 0.6% C, or stainless steel alloys.

A metal cord as subject of the invention has the advantage that the weld on strand level, does not provide an inflexible zone to the metal cord, which, in case such zone would be present, disturbs the use (e.g. bending) of the cord or the product in which the cord is used.

Further, since preferably only a few, or even only one strand is welded, for each radial cross-section of the metal cord, the cord is not weakened too much. The tensile strength of the cord, at the location of the welded strand, approaches minimally the sum of the tensile strengths of the non-welded metal strands in the metal cord. The force at rupture of the metal cord as subject of the invention comprising welded strand is usually more than 50%, e.g. more than 60% of the force at rupture of an identical metal cord without strand welds.

The elongation at rupture of the metal cord as subject of the invention comprising a welded strand is usually more than 50% e.g. more than 60% or even more than 70% such as more than 80%, e.g. more than 90% of the elongation at rupture of an identical metal cord without welded per radial cross-section or over its welded part length. Since usually high security factors for cord loads are used, the presence of one or a few strand welds does not cause any additional risk. The elongation at rupture of the metal cord comprising one or a few strand welds is larger compared to the elongation at rupture of a metal cord being welded over the whole cross-section of the cord.

Since the metal cords as subject of the invention, overcomes the presently known technical drawbacks, the cord manufacturer is also able to reduce the waste-level, and the cords can be provided in a more economical way.

Therefor metal cord as subject of the invention may e.g. be used to reinforce polymer, such as polyurethane, or rubber belts, such as timing belts, elevator or hoisting belts, conveyor belts, V-belts either without ribs or with ribs in longitudinal or perpendicular direction, or can be used for hoisting cables, control cables or in several automotive applications such as tires or window elevator cable. Due to the improved force at rupture of the metal cord as subject of the invention, the risk on a cascade effect can be decreased over a larger load range, as compared to cords being welded over the whole cross-section.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
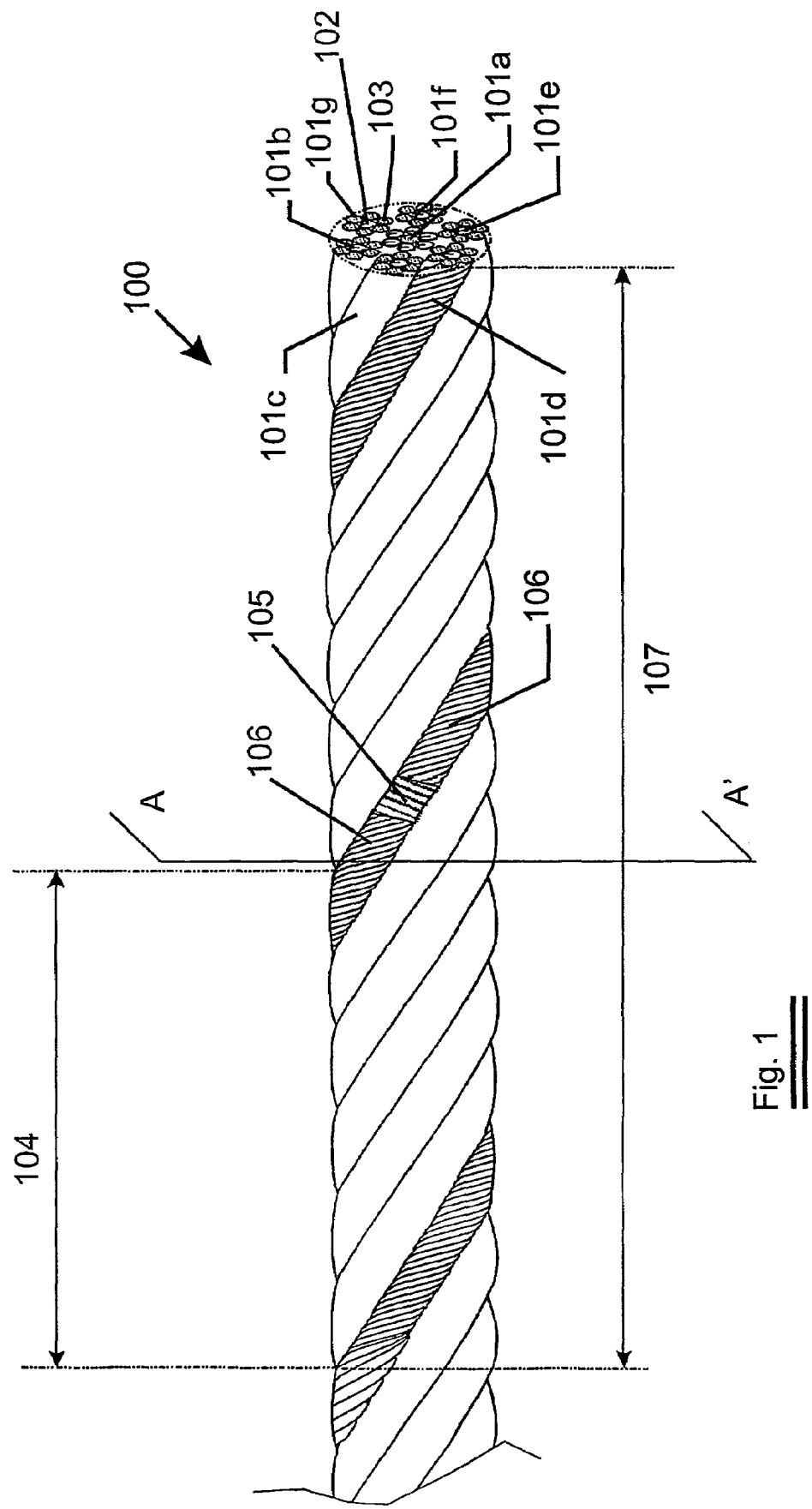
FIG. 1 shows schematically a metal cord as subject of the invention.

An embodiment of a metal cord as subject of the invention is shown in FIG. 1. A metal cord 100, provided out of steel having 0.7% C, having a construction "(0.21+6×0.19)+6× (0.19+6×0.175)". The cord comprises 7 strands (101a, 101b, 101c, 101d, 101e, 101f and 101g). The core strand 101a comprising a core filament 102 of diameter 0.21 mm, being encircled by 6 filaments 103 of a diameter 0.19 mm. The other outer strands 101b, 101c, 101d, 101e, 101f and 101g having all a core filament 102 of diameter 0.19 mm, and 6 encircling filaments 103 of 0.175 mm.

The lay length 104 of the metal cord 101 is 12.5 mm. The core strand 101a has a lay length of 6.3 mm and the outer strands 101b, 101c, 101d, 101e, 101f and 101g having all a lay length of 8 mm. The core strand 101a and the metal cord itself are twisted in the same direction (S or Z direction) whereas the strands 101b, 101c, 101d, 101e, 101f and 101g all being twined in the opposite direction (Z, respectively S).

Figure 2:
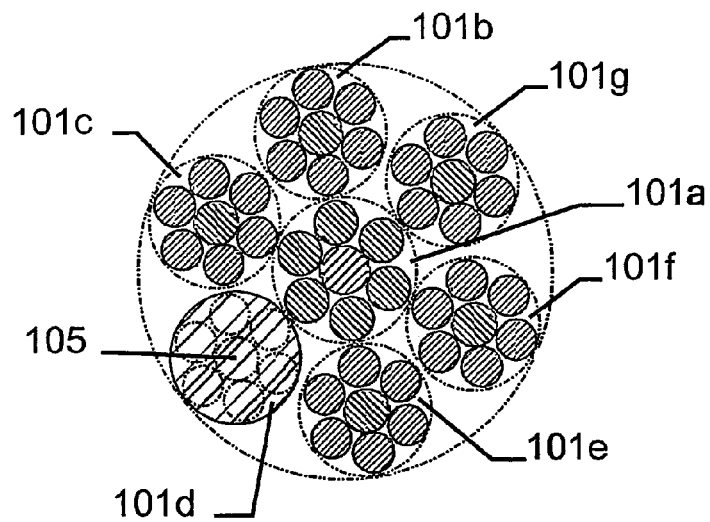
FIG. 2 shows schematically a radial cross-section according to the plane AA' of the metal cord of FIG. 1.

As shown in FIG. 2, being a radial section of the metal cord of FIG. 1 according to the plane AA', strand 101d has a weld 105, whereas the other strands (101a, 101b, 101c, 101e, 101f and 101g) are not welded in this section. As shown in FIG. 1, adjacent to both sides of the weld 105, strand 101d has a zone or length 106, where the strand has a significantly higher torsion.

Where outer strands normally have lay length of 8 mm, in zones 106, strand 101d has a lay length of 5 mm.

Strand 101*d* is incorporated in the metal cord using cabling operations. define a welded part length 107 of the cord, which is for the present embodiment equal to the lay length of the metal cord. In this zone determined by length 107, the strands 101*a*, 101*b*, 101*c*, 101*e*, 101*f* and 101*g* have no weld. The diameter of the weld is essentially equal to the optical strand diameter, being 0.54 mm FIGS. 3 and 4 show load-elongation curves of strands and cords, having in abscissa the elongation, expressed in %, and in ordinate the force applied (expressed in Newton)

Figure 3:
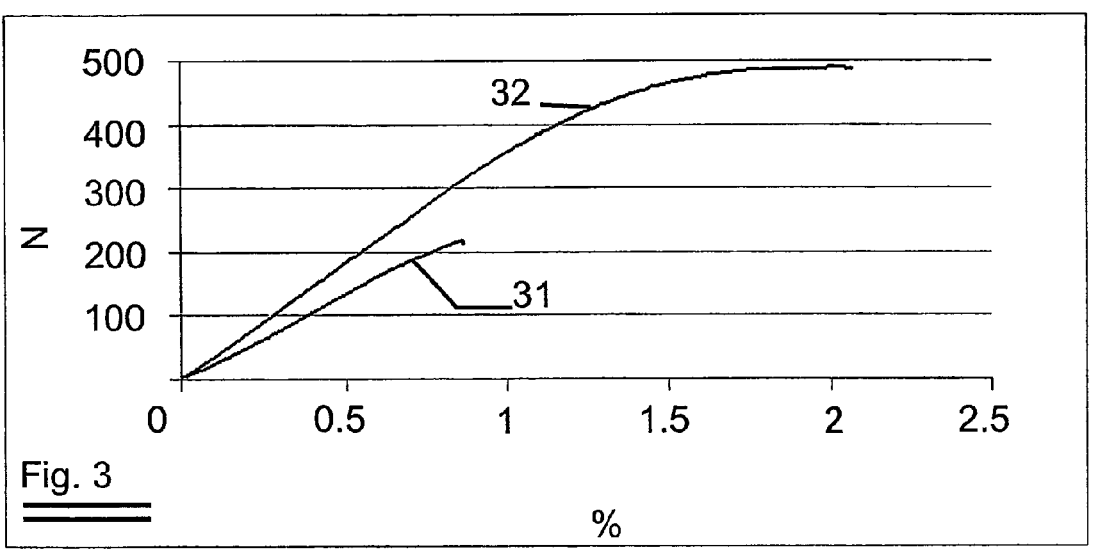
FIGS. 3 and 4 are load-elongation curves of the cord and used strands of FIG. 1.

FIG. 3 shows a load-elongation curve 31 of a strand 101*d* of FIG. 1, having a weld, compared to a load-elongation curve 32 of a reference strand, not being welded. It is noted that the elongation at rupture of a welded strand of curve 31 is 41.8% of the elongation at rupture of the reference strand.

Figure 4:
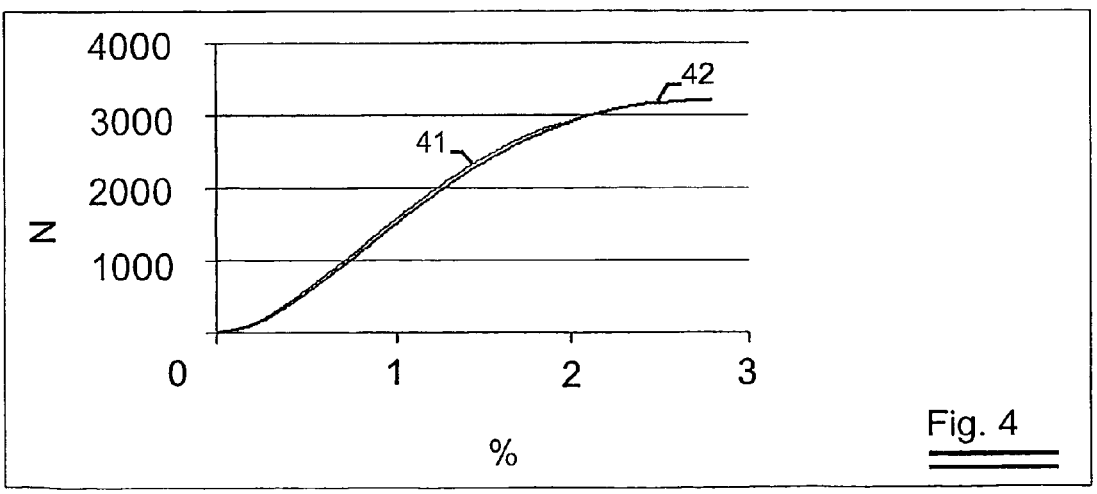

FIG. 4 clearly shows that a metal cord as in FIG. 1 and FIG. 2, comprising one strand with a weld, of which the load-elongation curve is shown in FIG. 3, has a load-elongation curve 41 which is essentially identical to a load-elongation curve 42 of a similar metal cord, not comprising a weld. The elongation at rupture of the strand-welded cord (curve 41) is 69% of the elongation at rupture of a not-welded metal cord, whereas the force at rupture of the strand-welded metal cord is even 90% of the not-welded metal cord.

Figure 5:
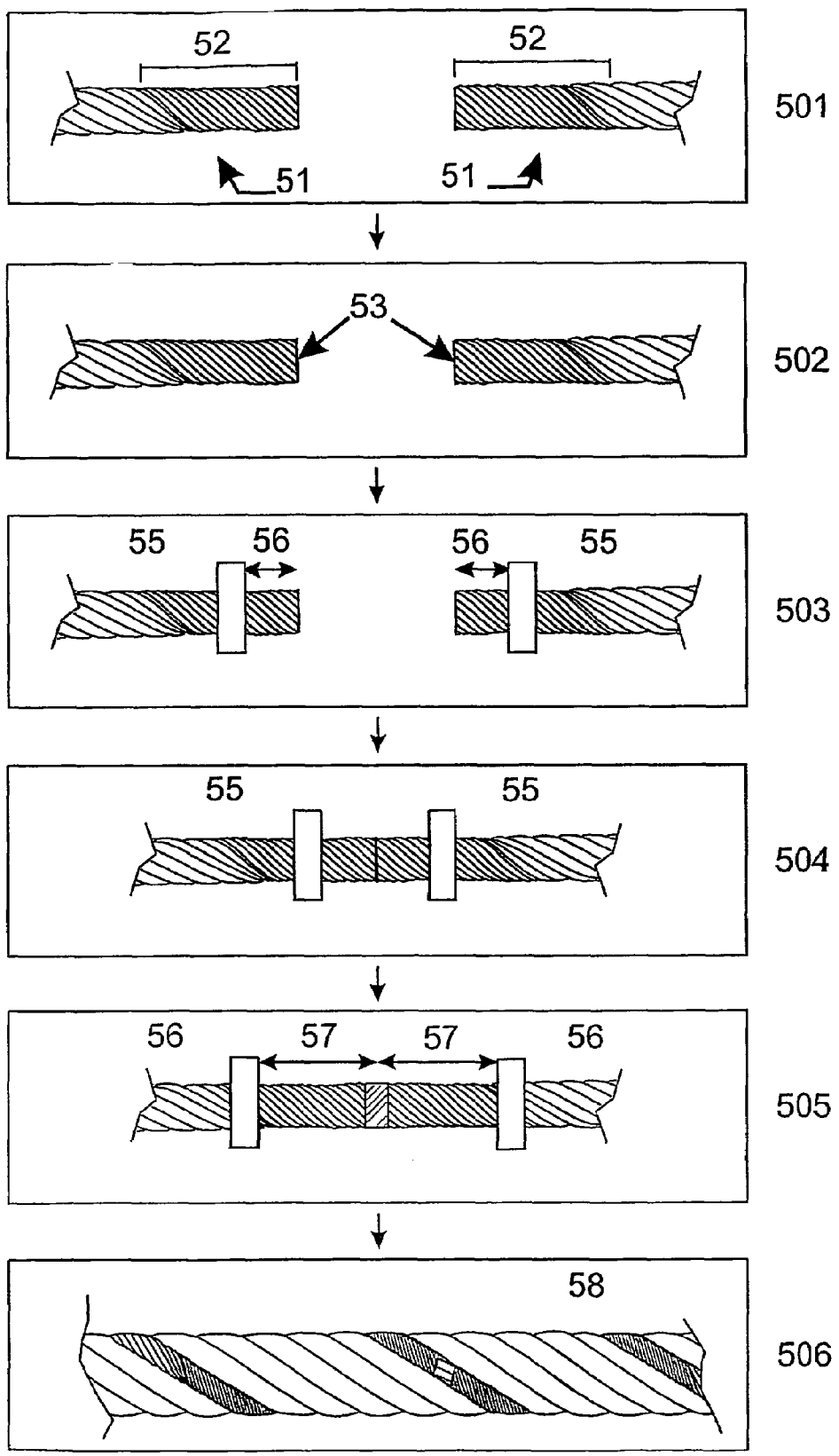
FIG. 5 shows a chart of a method to provide a metal cord as subject of the invention.

A method to provide a metal cord as subject of the invention is schematically shown in FIG. 5. E.g. a strand may break or the spool, providing such strand may run empty. Or a filament used to provide a strand may break during production of the strand. In such cases, according to the invention, two ends of a strand are to be connected to each other.

In step 501, both ends 51 are given a significantly lower lay length, e.g. lay length of 5 mm in stead of the original 8 mm., over a length 52, e.g. being 60 mm.

In step 502, at the outer surface of ends 51, the ends are given an essentially flat outer cross-section 54.

Two welding electrodes 55 are fixed one to each end 51 at a distance 56 to the cross-section 53, smaller than the length 52 (step 503).

During the welding step 504, both ends 51 are brought in connection to each other at the cross-sections 53, using a preset pressure. The electrodes 55 provide a specified current through the strand for a preset time, which causes welding of the strand.

The weld is than annealed during annealing step 505. Two annealing electrodes 56 are fixed to the strand, one at each side of the weld. The distance 57 between the annealing electrode and the middle of the weld is preferably smaller than the length 52. Possibly, but not necessarily, the welding electrodes may be used as annealing electrodes. During a preset time, a preset current is flowing through the weld.

The welded strand is than further used in cabling or bunching operation 506 in order to provide a metal cord 58 as subject of the invention.

Such metal cord as subject of the invention can be used to provide a belt, comprising several metal cords as subject of the invention and a polymer matrix, e.g. polyurethane.

Figure 6:
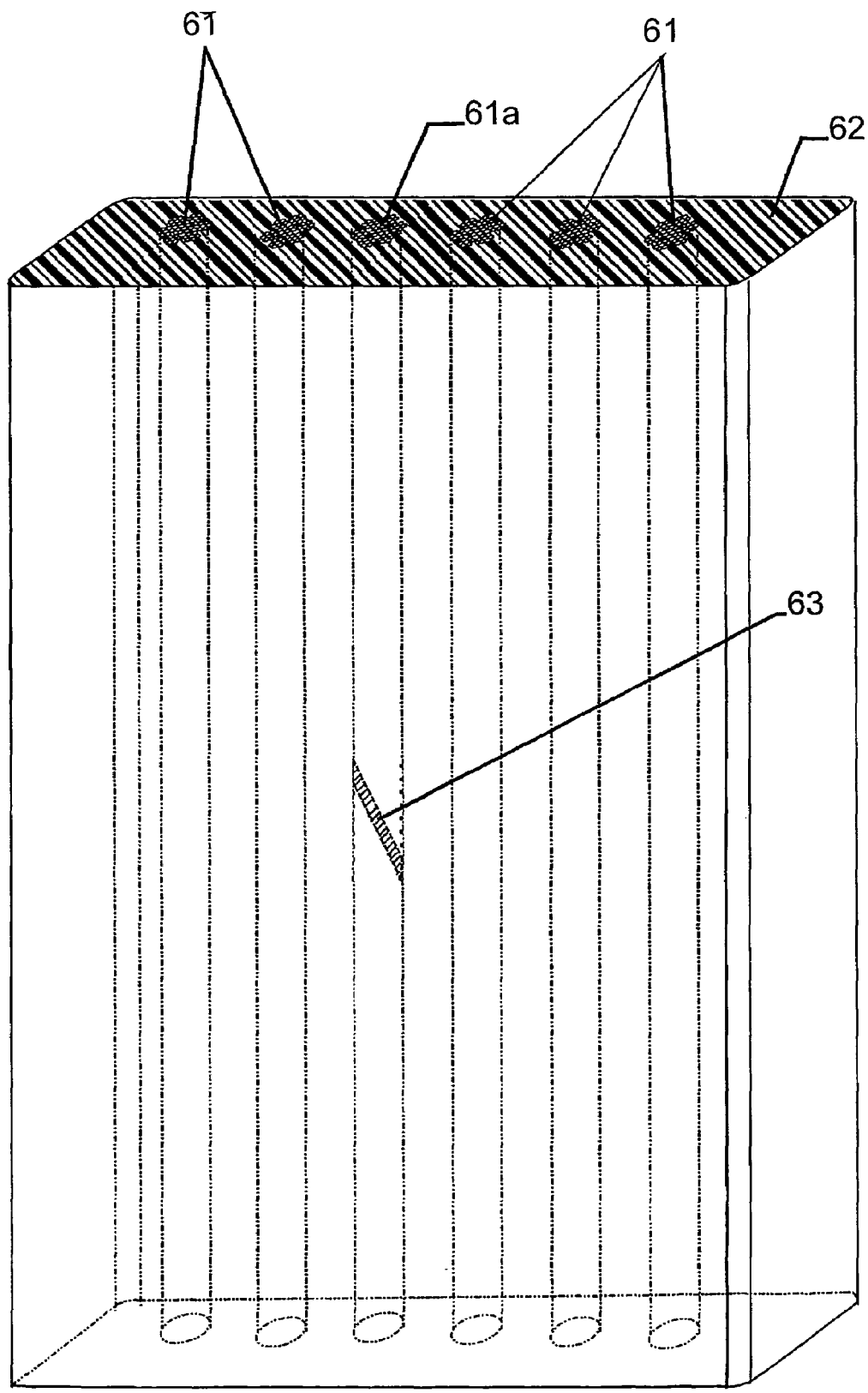
FIG. 6 shows a polymer tape, comprising more than one metal cords as subject of the invention.

As shown in FIG. 6, metal cords 61 as subjects of the invention are embedded in a polyurethane matrix 62. The metal cord 61*a* has a weld 63 in one of its strands, used to provide the cord 61*a*. Such belt can be used as elevator belt or for several other purposes.

The invention claimed is:

1. A metal load bearing cord comprising at least two metal strands adapted to bear a tensile load, said metal strands comprising twisted metal filaments, wherein at least one of said strands comprises a weld part wherein the at least one of said strands is interrupted and welded together, wherein the weld part includes a welded part length, wherein said welded part length is at least 2.5 times a lay length of said metal load bearing cord.

2. A metal cord as in claim 1, wherein a force of rupture of the at least one of said strands at said weld part is more than 30% of a force at rupture of the at least one of said strands away from said weld part.

3. A metal cord as in claim 1, wherein a diameter at the weld part is less than 1.2 times the optical strand diameter of the at least one of said strands away from said weld part.

4. A metal cord as in claim 1, wherein for each radial cross-section of said metal cord, at least one of said metal strands is not welded.

5. A metal cord as in claim 1, wherein for each radial cross-section of said metal cord, only one of said strands is welded.

6. A metal cord comprising at least two metal strands, said metal strands comprising twisted metal filaments, wherein at least one of said strands comprises a weld part wherein the at least one of said strands is interrupted and welded together, wherein an elongation at rupture of the at least one of said strands at said weld part is at least 30% of the elongation at rupture of the at least one of said strands away from said weld part, wherein the weld part includes a welded part length, wherein said welded part length is at least 2.5 times a lay length of said metal cord.

7. A metal cord as in claim 1, wherein an optical cord diameter of said metal cord is less than 14 mm.

8. A metal cord as in claim 7, wherein the optical cord diameter of said metal cord is less than 2.5 mm.

9. A metal cord as in claim 1, wherein an optical strand diameter of said metal strands is less than 5 mm.

10. A metal cord as in claim 9, wherein the optical strand diameter of said metal strands is less than 0.9 mm.

11. A metal cord as in claim 1, wherein a diameter of said filaments is smaller than 1.15 mm.

12. A metal cord as in claim 11, wherein the diameter of said filaments is smaller than 0.25 mm.

13. A metal cord as in claim 1, wherein said metal cord is a steel cord.

14. A metal cord as in claim 1, wherein a force at rupture of said metal cord at said weld part is at least 50% of a force at rupture of said metal cord away from said weld part.

15. A metal cord as in claim 1, wherein an elongation at rupture of said metal cord at said weld part is at least 80% of the elongation at rupture of said metal cord away from said weld part.

16. A reinforced polymer, comprising the metal cord according to claim 1.

17. A reinforced polymer as claimed in claim 16, wherein said reinforced polymer is an elevator belt.

18. A reinforced polymer as claimed in claim 16, wherein said reinforced polymer is a timing belt.

19. A reinforced polymer as claimed in claim 16, wherein said reinforced polymer is a hoisting cable.

20. A reinforced polymer as claimed in claim 16, wherein said reinforced polymer is a reinforced rubber belt.

21. A reinforced polymer as claimed in claim 16, wherein said reinforced polymer is a hoisting belt.

22. A reinforced polymer as claimed in claim 16, wherein said reinforced polymer is a control cable.

23. A reinforced polymer as claimed in claim 16, wherein said reinforced polymer is a window elevator cable.

24. A metal cord as in claim 1, wherein all filaments of the interrupted strand in the weld part are interrupted filaments that are welded together.

25. A metal cord as in claim 1, wherein the weld part comprises two strand ends that have been welded together.

26. A metal cord as in claim 25, wherein the two strand ends are welded face to face.

27. A metal cord comprising at least two metal strands, said metal strands comprising twisted metal filaments, wherein at least one of said strands comprises a weld part, wherein the at least one of said strands is interrupted and welded together, wherein an elongation at rupture of the at least one of said strands at said weld part is at least 30% of the elongation at rupture of the at least one of said strands away from said weld part, wherein a lay length of the at least one of said strands in said weld part is less than a lay length of the at least one of said strands away from said weld part.

28. A metal cord as in claim 27, wherein the lay length of the at least one of said strands in said weld part is less than 75% of the lay length of the at least one of said strands away from said weld part.

29. A metal cord as in claim 27, wherein the lay length of the at least one of said strands in said weld part is less than 65% of the lay length of the at least one of said strands away from said weld part.

30. A metal cord as in claim 27, wherein the lay length of the at least one of said strands in said weld part is less than 50% of the lay length of the at least one of said strands away from said weld part.

31. A metal cord as in claim 27, wherein all filaments of the interrupted strand in the weld part are interrupted filaments that are welded together.

32. A metal cord as in claim 27, wherein the weld part comprises two strand ends that have been welded together.

33. A metal cord as in claim 32, wherein the two strand ends are welded face to face.

34. A metal cord as in claim 1, wherein another of the said at least two strands is not welded proximate said weld part.

35. A metal cord as in claim 6, wherein another of the said at least two strands is not welded proximate said weld part.

36. A metal cord as in claim 1, wherein each radial cross-section of said metal cord includes only one metal strand which is welded.

37. A metal cord as in claim 1, wherein no cross-section of said metal cord, taken normal to a longitudinal axis of said metal cord, bisects more than one weld part.

* * * * *